(12) United States Patent
Sato et al.

(10) Patent No.: US 11,378,070 B2
(45) Date of Patent: Jul. 5, 2022

(54) CONTROL DEVICE, CONTROL METHOD, MOTOR, AND ELECTRIC OIL PUMP

(71) Applicant: Nidec Tosok Corporation, Zama (JP)

(72) Inventors: Kei Sato, Zama (JP); Yuichi Hibi, Zama (JP); Yasuhiro Shirai, Zama (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 660 days.

(21) Appl. No.: 16/335,275

(22) PCT Filed: Sep. 25, 2017

(86) PCT No.: PCT/JP2017/034522
§ 371 (c)(1),
(2) Date: Mar. 21, 2019

(87) PCT Pub. No.: WO2018/062096
PCT Pub. Date: Apr. 5, 2018

(65) Prior Publication Data
US 2020/0018304 A1    Jan. 16, 2020

(30) Foreign Application Priority Data
Sep. 30, 2016    (JP) .............................. JP2016-194686

(51) Int. Cl.
*F04B 43/04*    (2006.01)
*F04B 35/04*    (2006.01)
(Continued)

(52) U.S. Cl.
CPC .............. *F04B 43/04* (2013.01); *F04B 35/04* (2013.01); *F04B 49/06* (2013.01); *H02P 6/16* (2013.01)

(58) Field of Classification Search
CPC .......... F04B 43/04; F04B 35/05; F04B 49/06; H02P 6/16
See application file for complete search history.

(56) References Cited

U.S. PATENT DOCUMENTS 7,746,023 B2 *  6/2010  Ajima .................. G01D 5/2046
                                                318/700
8,847,528 B2     9/2014  Kato et al.
(Continued)

FOREIGN PATENT DOCUMENTS

CN    101398439 A     4/2009
CN    102291084 A    12/2011
(Continued)

OTHER PUBLICATIONS

Official Communication issued in International Patent Application No. PCT/JP2017/034522, dated Dec. 19, 2017.

*Primary Examiner* — Patrick Hamo
(74) *Attorney, Agent, or Firm* — Keating & Bennett

(57) ABSTRACT

A controller of a motor control device increases a voltage to be applied to a coil based on a control signal calculated from an estimated rotation speed, when the estimated rotation speed becomes equal to or lower than a predetermined rotation speed, increases the voltage to be applied to the coil based on a control signal calculated from an actual rotation speed, in a case where the actual rotation speed is lower than the predetermined rotation speed when the estimated rotation speed becomes higher than the predetermined rotation speed, and decreases the voltage to be applied to the coil based on a control signal calculated from the actual rotation speed, in a case where the actual rotation speed is higher than the predetermined rotation speed when the estimated rotation speed becomes higher than the predetermined rotation speed.

26 Claims, 9 Drawing Sheets

(51) Int. Cl.
F04B 49/06 (2006.01)
H02P 6/16 (2016.01)

(56) References Cited

U.S. PATENT DOCUMENTS

| | | | | |
|---|---|---|---|---|
| 2007/0132423 | A1* | 6/2007 | Ajima | .................. H02P 6/10 |
| | | | | 318/719 |
| 2010/0045219 | A1* | 2/2010 | Ajima | .................. H02P 6/16 |
| | | | | 318/400.04 |
| 2016/0329845 | A1 | 11/2016 | Jannot et al. | |
| 2018/0167005 | A1* | 6/2018 | Shim | .................. F04B 49/20 |
| 2019/0271303 | A1* | 9/2019 | Endo | .................. F04B 17/03 |
| 2019/0316578 | A1* | 10/2019 | Araki | .................. F04B 49/20 |
| 2020/0200166 | A1* | 6/2020 | Yamamoto | .............. F04B 49/06 |

FOREIGN PATENT DOCUMENTS

| | | | |
|---|---|---|---|
| CN | 103026610 | A | 4/2013 |
| CN | 104203634 | A | 12/2014 |
| CN | 105144573 | A | 12/2015 |
| CN | 105900317 | A | 8/2016 |
| JP | 04-368475 | A | 12/1992 |
| JP | 2003-227468 | A | 8/2003 |
| JP | 2006-074951 | A | 3/2006 |
| JP | 2007-229256 | A | 9/2007 |
| JP | 2008-072820 | A | 3/2008 |
| JP | 2013-163237 | A | 8/2013 |
| JP | 2013-172550 | A | 9/2013 |
| JP | 2013-207891 | A | 10/2013 |
| JP | 2014-009655 | A | 1/2014 |

* cited by examiner

CONTROL DEVICE, CONTROL METHOD, MOTOR, AND ELECTRIC OIL PUMP

TECHNICAL FIELD

The present disclosure relates to a control device, a control method, a motor, and an electric oil pump.

BACKGROUND ART

Regarding devices such as an electric oil pump driven by a motor, a technique in which high responsiveness of a device is realized by not stopping a motor when the device is not used but rotating the motor at a lower speed than when the device is used is known. Japanese Unexamined Patent Application Publication No. H04-368475 discloses a control device that maintains low-speed rotation of an electric motor by returning a rotation speed thereof to an original speed in a case where the rotation speed of the electric motor suddenly decreases.

However, the control device of Japanese Unexamined Patent Application Publication No. H04-368475 needs a sudden change in the rotation speed for control. Depending on a rotation speed of the motor controlled to be in the low-speed rotation, it may be difficult to maintain the low-speed rotation of the motor in the control device of Japanese Unexamined Patent Application Publication No. H04-368475, because the rotation of the motor may be stopped due to a sudden change in the rotation speed.

SUMMARY OF THE DISCLOSURE

Example embodiments of the present disclosure provide control devices that each maintain low-speed rotation of a motor, for example.

An example embodiment of the present disclosure is a control device to control a motor that includes a stator including a coil and a rotor including a permanent magnet, the control device including a detector that detects a rotational position of the rotor for each predetermined rotary angle and outputs a positional signal indicating the detected rotational position, a first calculator that receives the positional signal output by the detector and calculates an actual rotation speed of the rotor based on a time interval at which the positional signal is received, a second calculator that calculates an estimated rotation speed of the rotor based on a time interval between a time point at which the first calculator receives the positional signal and an assumed time point at which the first calculator is assumed to receive a subsequent positional signal assuming that the first calculation portion receives the positional signal subsequent to the positional signal, a comparator that compares the actual rotation speed of the rotor calculated based on a time interval between when the first calculator receives the positional signal and when the first calculator receives a position signal prior to the position signal, the estimated rotation speed calculated by the second calculator, and a predetermined rotation speed of the rotor, during a period from when the first calculator receives the positional signal until the first calculator actually receives a subsequent positional signal, and a controller that calculates a control signal to adjust a voltage to be applied to the coil from the actual rotation speed or the estimated rotation speed and controls the voltage to be applied to the coil based on the calculated control signal, in which, based on results of the comparison by the comparator, the controller increases the voltage to be applied to the coil based on a control signal to increase the voltage to be applied to the coil, which is calculated from the estimated rotation speed, when the estimated rotation speed becomes equal to or lower than the predetermined rotation speed, increases the voltage to be applied to the coil based on a control signal to increase the voltage to be applied to the coil, which is calculated from the actual rotation speed, in a case where the actual rotation speed is lower than the predetermined rotation speed when the estimated rotation speed becomes higher than the predetermined rotation speed, and decreases the voltage to be applied to the coil based on a control signal to decrease the voltage to be applied to the coil, which is calculated from the actual rotation speed, in a case where the actual rotation speed is higher than the predetermined rotation speed when the estimated rotation speed becomes higher than the predetermined rotation speed.

According to the first example embodiment of the present disclosure, a control device that maintains low-speed rotation of a motor is able to be provided.

The above and other elements, features, steps, characteristics and advantages of the present disclosure will become more apparent from the following detailed description of example embodiments with reference to the attached drawings.

DETAILED DESCRIPTION OF EXAMPLE EMBODIMENTS

Figure 1:
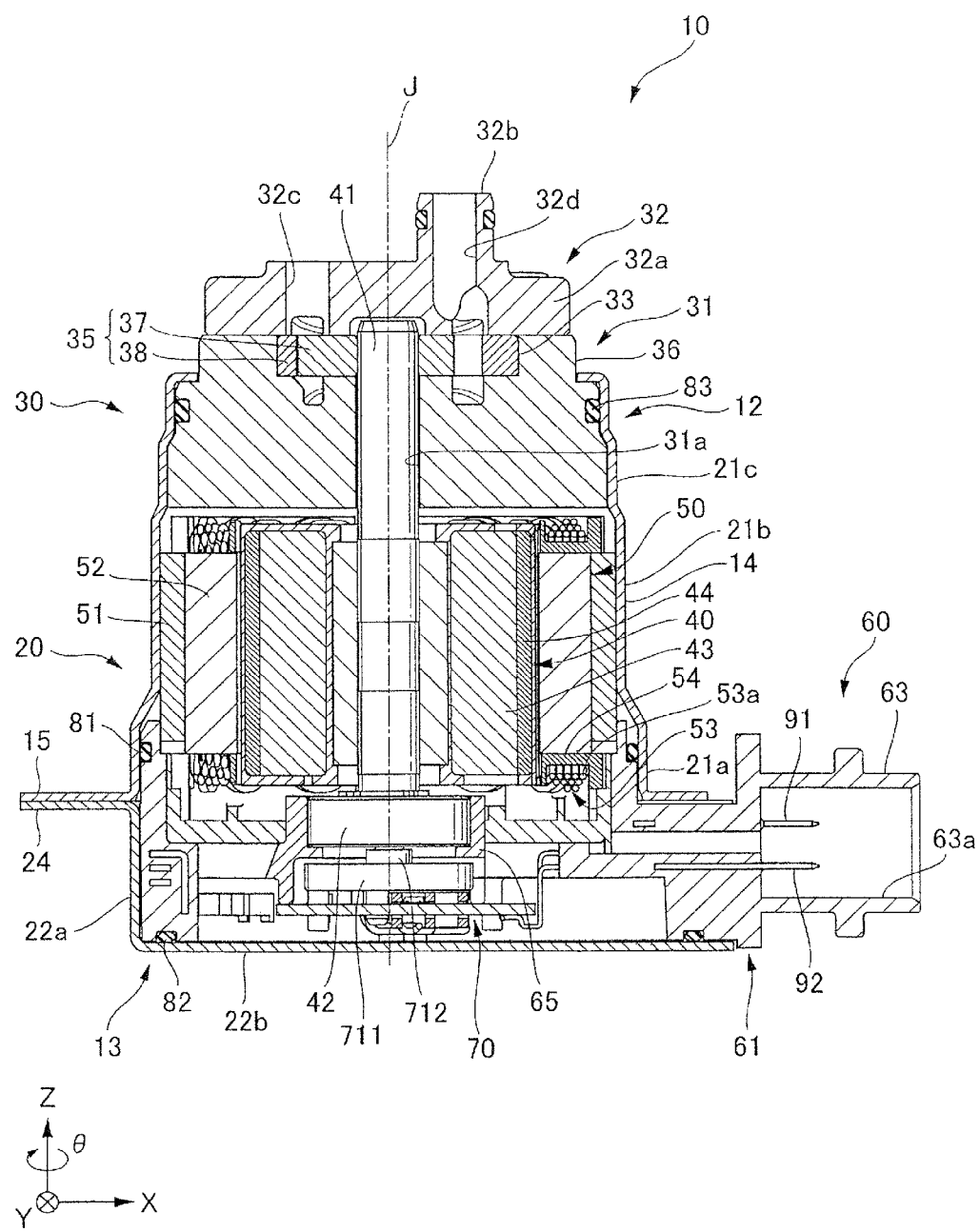
FIG. 1 is a view showing a configuration of an electric oil pump.

Hereinafter, example embodiments of the present disclosure will be described with reference to the drawings and the like. The scope of the present disclosure is not limited to the following example embodiments and can be arbitrarily changed within a range of the technical idea of the present disclosure. In addition, in the following drawings, scales, numbers and the like in each structure are changed by actual structures in some cases in order to make each configuration easy to understand.

In addition, in the drawings, an XYZ coordinate system is appropriately shown as a three-dimensional orthogonal coordinate system. In the XYZ coordinate system, a Z axis direction is a direction parallel to an axial direction (one direction) of a central axis J shown in FIG. 1. An X axis direction is a direction parallel to a length direction of a bus bar assembly 60 shown in FIG. 1, that is, a horizontal direction in FIG. 1. A Y axis direction is a direction parallel to a width direction of the bus bar assembly 60, that is, a direction orthogonal to both the X axis direction and the Z axis direction.

In addition, in the following description, a positive side (+Z side) in the Z axis direction is called a "front side" and a negative side (−Z side) in the Z axis direction is called a "rear side." The rear side and the front side are terms merely used for explanation and do not limit actual positional relationships or directions. Furthermore, unless otherwise specified, a direction parallel to the central axis J (Z axis direction) is simply referred to as an "axial direction," a radial direction around the central axis J is simply referred to as a "radial direction," and a circumferential direction around the central axis J, that is, a direction around the axis of the central axis J (θ direction), is simply referred to as a "circumferential direction."

In the present specification, the meaning of the phrase "extending in the axial direction" includes not only a case of strictly extending in the axial direction (Z axis direction) but also a case of extending in a direction inclined within a range of less than 45° of the axial direction. In addition, in the present specification, the meaning of the phrase "extending in a radial direction" includes not only a case of strictly extending in a radial direction, that is, a direction perpendicular to the axial direction (Z axis direction), but also a case of extending in a direction inclined within a range of less than 45° of a radial direction.

First Example Embodiment

<Electric Oil Pump>

FIG. 1 is a view showing a configuration of an electric oil pump 10 according to the present example embodiment. An electric oil pump 10 includes a shaft 41, a motor unit 20, a pump unit 30, a housing 12, and a control device 70. The shaft 41 rotates around the central axis J extending in the axial direction. The motor unit 20 and the pump unit 30 are provided side by side in the axial direction.

<Motor>

The motor unit 20 has a cover 13, a rotor 40, a stator 50, a bearing 42, a bus bar assembly 60, a front side O ring 81, and a rear side O ring 82.

The rotor 40 is fixed to an outer peripheral surface of the shaft 41. The stator 50 is located radially outward from the rotor 40. That is, the motor unit 20 is an inner-rotor-type motor. The bearing 42 rotatably supports the shaft 41. The bearing 42 is held by the bus bar assembly 60. The bus bar assembly 60 is connected to an external power source and supplies power to the stator 50.

<Cover>

A material of the cover 13 is, for example, a metal. The cover 13 is fixed to the rear side (−Z side) of the housing 12 and covers at least a part of the rear side (−Z side) of the bus bar assembly 60. The cover 13 has a cylindrical portion 22a, a lid portion 22b, and a flange portion 24. The cylindrical portion 22a opens on the front side (+Z side). The lid portion 22b is connected to an end portion on the rear side of the cylindrical portion 22a. In the present example embodiment, the lid portion 22b has a flat plate shape. The flange portion 24 extends radially outward from an end portion on the front side of the cylindrical portion 22a. The flange portion 15 of the housing 12 and the flange portion 24 of the cover 13 overlap and are joined together.

<Rotor>

The rotor 40 has a rotor core 43 and a rotor magnet 44. The rotor core 43 surrounds the shaft 41 around the axis (θ direction) and is fixed to the shaft 41. The rotor magnet 44 is fixed to an outer surface along the axis of the rotor core 43. The rotor core 43 and the rotor magnet 44 rotate integrally with the shaft 41. As the rotor magnet 44, a permanent magnet is used. In the present example embodiment, a rare earth magnet (neodymium magnet or the like) having strong attractive force and repulsive force is particularly used.

<Stator>

The stator 50 surrounds the rotor 40 around the axis (θ direction), and rotates the rotor 40 around the central axis J. The stator 50 has a core back portion 51, a tooth portion 52, a coil 53, and a bobbin (insulator) 54.

Figure 2:
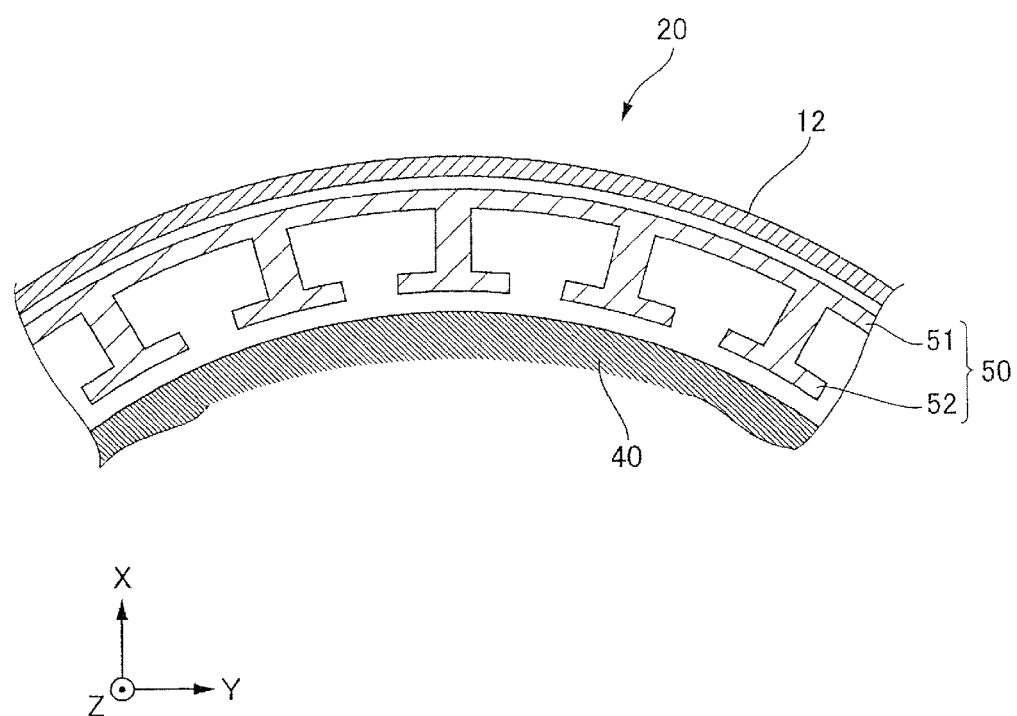
FIG. 2 is a cross sectional view of a tooth portion viewed in a Z axis direction.

A shape of the core back portion 51 is a cylindrical shape concentric with the shaft 41. FIG. 2 is a cross sectional view of the tooth portion 52 viewed in the Z axis direction. The tooth portion 52 extends from an inner surface of the core back portion 51 toward the shaft 41. A plurality of tooth portions 52 are provided and disposed at equal intervals in the circumferential direction of the inner surface of the core back portion 51. The coil 53 is formed by winding a conductive wire 53a. The coil 53 is provided on the bobbin 54. The bobbin 54 is attached to each tooth portion 52.

<Bearing>

The bearing 42 is disposed on the rear side (−Z side) of the stator 50. The bearing 42 is held by a bearing holding portion 65 that a bus bar holder 61 has, which will be described later. The bearing 42 supports the shaft 41. The configuration of the bearing 42 is not particularly limited, and any well-known bearing may be used.

<Bus Bar Assembly>

The bus bar assembly 60 has a bus bar 91 electrically connected to the stator 50 and the bus bar holder 61 holding the bus bar. The bus bar holder 61 has an opening portion on the rear side. The lid portion 22b of the cover 13 covers the opening portion on the rear side of the bus bar holder 61. In addition, the front side surface of the lid portion 22b of the cover 13 is in contact with the entire circumference of the rear side O ring 82. Accordingly, the cover 13 is in contact with a rear surface of a main body portion on the rear side of the bus bar holder 61 via the rear side O ring 82 over the entire periphery of the opening portion of the bus bar holder 61.

The bus bar holder 61 has a connector portion 63. The motor unit 20 and the external power source are connected via the connector portion 63. The connected external power source is electrically connected to the bus bar 91 and a wiring member 92 which project from the bottom of an opening 63a for a power source that the connector portion 63 has. Accordingly, a driving current is supplied to the coil 53 of the stator 50 via the bus bar 91 and the wiring member 92.

<Pump Unit>

The pump unit 30 of the present example embodiment is a gear pump that sucks and discharges oil by changing an internal volume with a rotational motion of the gear. The gear pump is one of a positive displacement pump. In addition, a diaphragm pump which changes the internal volume with a reciprocating motion of a diaphragm can also be used as the gear pump. By using the positive displacement pump, oil can be sucked and discharged even when a motor is rotated at a low speed, and therefore high responsiveness of the electric oil pump can be achieved.

The pump unit 30 is located on one side in the axial direction of the motor unit 20, specifically on the front side (+Z axis side). The pump unit 30 is driven by the motor unit 20 via the shaft 41. The pump unit 30 has a pump body 31, a pump cover 32, and a pump rotor 35.

The pump body 31 is fixed in the housing 12 on the front side of the motor unit 20. An outer peripheral surface of the pump body 31 is contact with an inner peripheral surface of the housing 12 via a pump unit O ring 83, in the radial direction. The pump body 31 has a pump chamber 33 that accommodates the pump rotor 35 and is recessed from the front side (+Z side) surface to the rear side (−Z side). A shape seen in the axial direction of the pump chamber 33 is a circular shape.

The pump body 31 has a through hole 31a which opens at both ends in the axial direction, thereby allowing the shaft 41 to pass therethrough, and in which an opening on the front side opens in the pump chamber 33. The opening on the rear side of the through hole 31a opens on the motor unit 20 side. The through hole 31a functions as a bearing member that rotatably supports the shaft 41.

The pump body 31 has an exposed portion 36 that is located on a side more frontward than the housing 12 and is exposed at the outside of the housing 12. The exposed portion 36 is a portion of an end portion on the front side of the pump body 31. The exposed portion 36 has a columnar shape extending in the axial direction. The exposed portion 36 overlaps the pump chamber 33 in the radial direction.

The pump cover 32 is attached to the front side of the pump body 31. The pump cover 32 has a pump cover main body 32a, a pump connector portion 32b having a discharge port 32d, and a suction port 32c. The pump cover main body 32a has a disc shape expanding in the radial direction. The pump cover main body 32a blocks the opening on the front side of the pump chamber 33. The pump connector portion 32b has a cylindrical shape extending in the axial direction. The pump connector portion 32b has the discharge port 32d that opens at both ends in the axial direction. The pump connector portion 32b extends toward the front side from the pump cover main body 32a. The suction port 32c opens on the front side surface of the pump cover 32. The discharge port 32d and the suction port 32c are connected to the pump chamber 33, thereby making it possible to suck oil into the pump chamber 33 and discharge oil from the pump chamber 33. In a case where the shaft 41 rotates in one circumferential direction (−θ direction), oil is sucked into the pump chamber 33 from the suction port 32c. The oil sucked into the pump chamber 33 is sent by the pump rotor 35 to the discharge port 32d to be discharged.

The pump rotor 35 has an inner rotor 37 and an outer rotor 38. The inner rotor 37 is attached to an end portion on the front side of the shaft 41. The outer rotor 38 is disposed to surround a radial outer side of the inner rotor 37. The inner rotor 37 is annular and is a gear having teeth on a radially outward surface.

The inner rotor 37 and the outer rotor 38 mesh with each other, and therefore the outer rotor 38 rotates when the inner rotor 37 rotates. With rotation of the inner rotor 37 and the outer rotor 38, oil sucked into the pump chamber 33 from the suction port 32c can be sent to the discharge port 32d. That is, the rotation of the shaft 41 makes the pump rotor 35 rotate. In other words, the motor unit 20 and the pump unit 30 have the same rotation shaft.

<Housing>

The housing 12 has a multi-stage cylindrical shape in which both ends open toward the central axis J. A material of the housing 12 is, for example, a metal. The housing 12 holds the motor unit 20 and the pump unit 30. The housing 12 has a cylindrical portion 14 and a flange portion 15. The cylindrical portion 14 has a cylindrical shape with the central axis J as the center. The cylindrical portion 14 has a bus bar assembly insertion portion 21a, a stator holding portion 21b, and a pump body holding portion 21c in that order from the rear side (−Z side) toward the front side (+Z side) in the axial direction (Z axis direction). The flange portion 15 extends radially outward from an end portion on the rear side of the cylindrical portion 14.

An end portion on the rear side of the bus bar assembly insertion portion 21a is interlocked with the cylindrical portion 22a of the cover 13 via the flange portion 24 of the cover 13 and the flange portion 15 of the housing 12. The bus bar assembly insertion portion 21a surrounds the end portion on the front side (+Z side) of the bus bar assembly 60 from the radially outer side of the central axis J. The bus bar assembly insertion portion 21a, the stator holding portion 21b, and the pump body holding portion 21c are concentric cylindrical shapes, and diameters thereof are reduced in the order of appearance of the terms.

The end portion on the front side of the bus bar assembly 60 is located inside the housing 12. An outer side surface of the stator 50, that is, an outer side surface of the core back portion 51, is in contact with an inner side surface of the stator holding portion 21b. Accordingly, the stator 50 is held in the housing 12. An outer peripheral surface of the pump body 31 is fixed to an inner peripheral surface of the pump body holding portion 21c.

<Control Device>

Figure 3:
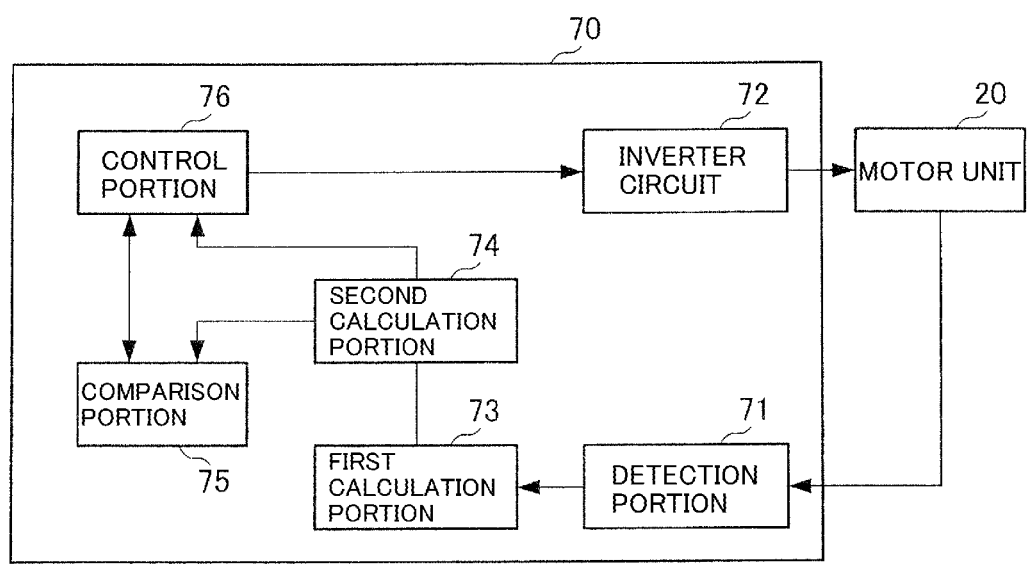
FIG. 3 is a block diagram showing a relationship between elements included in a control device and a relationship between the control device and a motor.

A control device 70 is disposed between the bearing 42 and the cover 13 and controls the driving of the motor unit 20. The control device 70 includes a detection portion 71, an inverter circuit 72, a first calculation portion 73, a second calculation portion 74, a comparison portion 75, and a control portion 76. FIG. 3 is a block diagram showing a relationship between elements included in the control device 70 and a relationship between the control device 70 and the motor unit 20.

The inverter circuit 72 outputs a motor driving voltage. As the detection portion 71, a magnetic sensor such as a Hall element and a magnetic resistance element, an optical encoder, or a resolver can be used. In the present example embodiment, a Hall element which is a magnetic sensor is used. The detection portion 71 has a sensor magnet 711 and a magnet holding portion 712.

The sensor magnet 711 is annular and has N poles and S poles disposed alternately in the circumferential direction. The sensor magnet holding portion 712 is positioned by fitting a center hole on a small-diameter portion of the end portion on the rear side (+Z side) of the shaft 41. The sensor magnet holding portion 712 is rotatable together with the shaft 41. The sensor magnet 711 is disposed on an outer peripheral surface of the sensor magnet holding portion 712.

The detection portion 71 detects a rotational position of the rotor 40 for each predetermined angle by detecting changes in a magnetic flux of the sensor magnet 711, and outputs a positional signal indicating the detected rotational position to the first calculation portion 73. In the present example embodiment, the output positional signal is a set of positional signals composed of a plurality of signals. For example, in a case where the magnetic resistance element is used as the detection portion 71, one positional signal is output for each predetermined angle.

The first calculation portion 73 receives the positional signal output by the detection portion 71 and calculates an actual rotation speed of the rotor 40 on the basis of a time interval at which the positional signal is received. The second calculation portion 74 assumes that the first calculation portion 73 receives a subsequent positional signal (second positional signal) after receiving a first positional signal, and sets an assumed time point at which the second positional signal is assumed to be received. In addition, the second calculation portion 74 calculates an estimated rotation speed of the rotor 40 on the basis of the time interval between the time point at which the first calculation portion 73 receives the first positional signal and the assumed time point. The second calculation portion 74 may calculate the estimated rotation speed at a predetermined time interval or may continuously calculate the estimated rotation speed without a time interval, during a period from when the first calculation portion 73 receives the first positional signal until the first calculation portion 73 actually receives the second positional signal.

The comparison portion 75 obtains, from the first calculation portion 73, an actual rotation speed of the rotor 40, which is calculated on the basis of a time interval between when the first calculation portion 73 receives the first positional signal and when the first calculation portion 73 receives a position signal prior to the first position signal. In addition, the comparison portion 75 obtains the estimated rotation speed calculated by the second calculation portion 74 and the predetermined rotation speed of the rotor 40, and thereby compares the actual rotation speed, the estimated rotation speed, and the predetermined rotation speed, during the period from when the first calculation portion 73 receives the first positional signal until the first calculation portion 73 actually receives the second positional signal.

The control portion 76 has, for example, a calculation portion (a computer and the like) and a storage portion. The control portion 76 calculates a control signal for adjusting a voltage to be applied to the coil 53 from the actual rotation speed or the estimated rotation speed, and controls the voltage to be applied to the coil 53 on the basis of the calculated control signal. Calculation of the control signal can be calculated by the calculation portion by a PID control method. In addition, the control portion 76 adjusts a duty ratio of a drive signal of the rotor 40 by a pulse width modulation method (PWM method) on the basis of the calculated control signal.

The control portion 76 outputs the adjusted drive signal of the rotor 40 to the inverter circuit 72. The inverter circuit 72 outputs a motor driving voltage on the basis of the drive signal of the rotor 40 from the control portion 76. A driving current on the basis of the drive voltage from the inverter circuit 72 is supplied to the coil 53. A magnetic field is generated by the supply of the driving current to the coil 53, and the rotor 40 is rotated by this magnetic field. In this manner, the motor unit 20 obtains rotational driving force. The driving current is supplied to the coil 53 of the stator 50 via the bus bar 91 and the wiring member 92.

The predetermined rotation speed of the rotor 40 may be held by the comparison portion 75 or may be stored in the storage portion that the control portion 76 has. In a case where the predetermined rotation speed is stored in the storage portion, the comparison portion 75 refers to the predetermined rotation speed stored in the storage portion. The predetermined rotation speed is a rotation speed at which the rotation of the rotor is not stopped under the influence of cogging torque when the electric oil pump is not used, and is set to a rotation speed lower than that when the electric oil pump is used. In the present example embodiment, the predetermined rotation speed is set to 100 rpm.

In a case of using a magnetic sensor as the detection portion 71, the number of times n the positional signal is output from the detection portion 71 during one rotation of the rotor 40 is a value obtained by multiplying the number of magnetic sensors by the number of magnetic poles detected by the magnetic sensor. The number of magnetic poles detected by the magnetic sensor may be larger than the number of magnetic poles of the permanent magnet of the rotor 40. In addition, it is desirable that the number of times n be equal to or more than a lowest common multiple of the number of magnetic poles of the permanent magnet of the rotor 40 and the number of tooth portions 52 (number of teeth) of the stator 50. By setting the number of times n to be equal to or more than the lowest common multiple, it is possible to output a rotational signal with a period shorter than a period of the cogging torque, which is determined from the number of magnetic poles of the permanent magnet of the rotor 40 and the number of teeth of the stator 50. Accordingly, the control portion 73 can impart, to the rotor 40, a rotational force that overcomes the cogging torque before the rotor 40 stops due to the influence of the cogging torque. Even in a case where the optical encoder or resolver is used as the detection portion 71, it is desirable that the number of times n be equal to or more than the lowest common multiple of the number of magnetic poles of the permanent magnet of the rotor 40 and the number of teeth of the stator 50.

<Adjustment Process>

Figure 4:
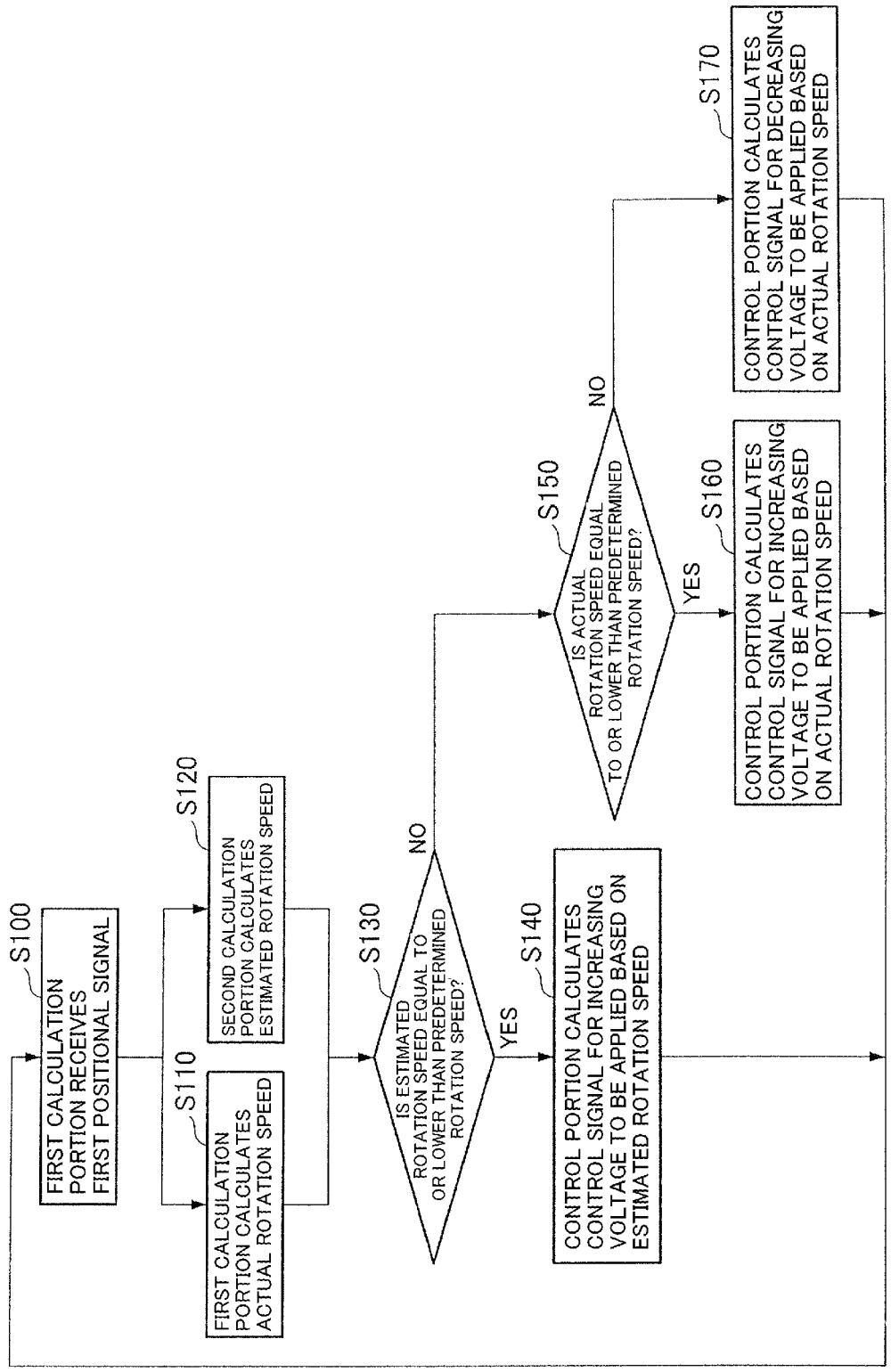
FIG. 4 is a flowchart showing a process of adjusting a drive signal of a rotor according to a first example embodiment of the present disclosure.
Figure 5:
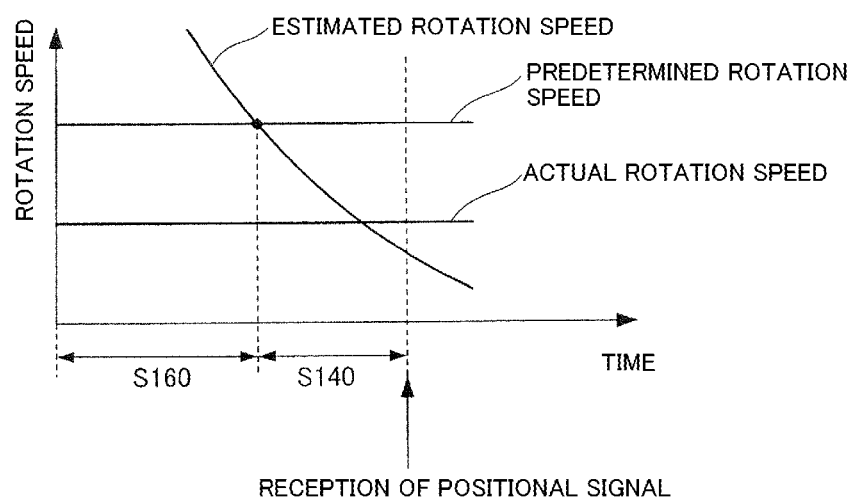
FIG. 5 is a graph showing a relationship between an actual rotation speed, an estimated rotation speed, and a predetermined rotation speed in a case where the actual rotation speed is lower than the predetermined rotation speed.
Figure 6:
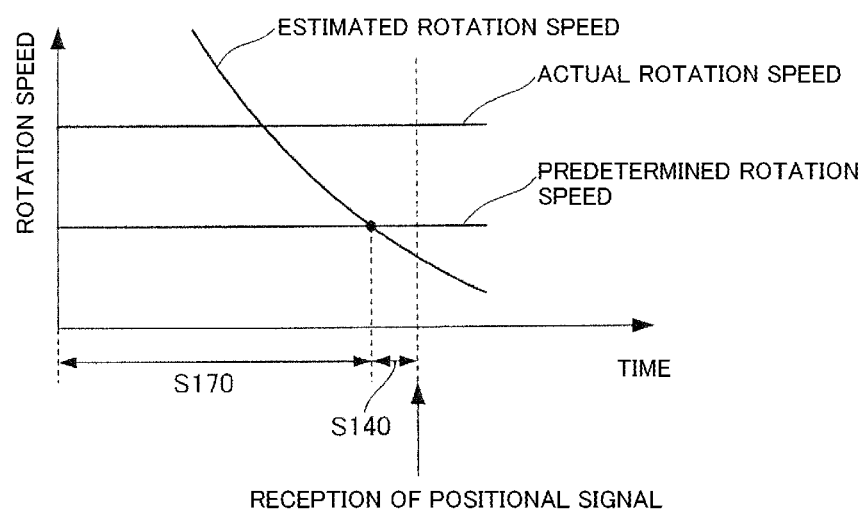
FIG. 6 is a graph showing a relationship between the actual rotation speed, the estimated rotation speed, and the predetermined rotation speed in a case where the actual rotation speed is higher than the predetermined rotation speed.

FIG. 4 is a flowchart showing a process of adjusting the drive signal of the rotor 40 performed by the control portion 76 included in the control device 70 of the motor unit 20 that drives the electric oil pump 10. FIG. 5 is a graph showing a relationship between the actual rotation speed, the estimated rotation speed, and the predetermined rotation speed in a case where the actual rotation speed is lower than the predetermined rotation speed. FIG. 6 is a graph showing a relationship between the actual rotation speed, the estimated rotation speed, and the predetermined rotation speed in a case where the actual rotation speed is higher than the predetermined rotation speed. In FIG. 5 and FIG. 6, a horizontal axis represents time, and a vertical axis represents a rotation speed. FIG. 5 and FIG. 6 show a time width including the timing of performing steps (S140, S160, or S170) of adjusting the voltage by calculating the control signal shown in FIG. 4.

In the flowchart shown in FIG. 4, in step S100, the first calculation portion 73 receives the first positional signal indicating the rotational position of the rotor 40 detected for each predetermined rotary angle of the rotor 40. In step S110, the first calculation portion 73 calculates the actual rotation speed of the rotor 40 on the basis of a time interval between a time point at which the first positional signal is received and a time point at which a positional signal prior to the first positional signal is received. In step S120, the second calculation portion 74 sets an assumed time point at which the first calculation portion 73 receives a subsequent positional signal (second positional signal) after receiving the first positional signal. In addition, the second calculation portion 74 calculates an estimated rotation speed of the rotor 40 on the basis of the time interval between the time point at which the first calculation portion 73 receives the first positional signal and the assumed time point. In step S130, before the first calculation portion 73 actually receives the second positional signal, the comparison portion 75 compares the actual rotation speed calculated by the first calculation portion 73 in step S110, the estimated rotation speed calculated by the second calculation portion 74 in step S120, and the predetermined rotation speed.

In the comparison by the comparison portion 75 in step S130, it is determined whether the estimated rotation speed is equal to or lower than the predetermined rotation speed. In a case where the comparison portion 75 determines that the estimated rotation speed is equal to or lower than the predetermined rotation speed, in step S140, the control portion 76 calculates a control signal for increasing a voltage to be applied to the coil 53 from the estimated rotation speed, and thereby increases the voltage to be applied to the coil 53 on the basis of the calculated control signal. Specifically, for example, the control portion 76 calculates the control signal by adding the control signal on the basis of a difference between the predetermined rotation speed and the estimated rotation speed, to the result calculated by the PID control method from a difference between the predetermined rotation speed and the actual rotation speed. In a case where the comparison portion 75 determines that the estimated rotation speed is higher than the predetermined rotation speed in step S130, the process proceeds to step S150.

In step S150, the comparison portion 75 determines whether the actual rotation speed is equal to or lower than the predetermined rotation speed. In a case where the comparison portion 75 determines that the actual rotation speed is equal to or lower than the predetermined rotation speed, in step S160, the control portion 76 calculates a control signal for increasing a voltage to be applied to the coil 53 from the actual rotation speed, and thereby increases the voltage to be applied to the coil 53 on the basis of the calculated control signal. In a case where the comparison portion 75 determines that the actual rotation speed is higher than the predetermined rotation speed in step S150, in step S170, the control portion 76 calculates a control signal for decreasing a voltage to be applied to the coil 53 from the actual rotation speed, and thereby decreases the voltage to be applied to the coil 53 on the basis of the calculated control signal. After step S140, S160, or S170, the process returns to step S100 (reception of the second positional signal) to repeat this flow.

According to the above-described adjustment process, the control portion 76 can calculate the control signal on the basis of the estimated rotation speed to increase the voltage to be applied to the coil 53 when the estimated rotation speed becomes equal to or lower than the predetermined rotation speed, without waiting for the first calculation portion 73 to actually receive the second positional signal. In a case of starting control after waiting for the first calculation portion 73 to actually receive the second positional signal at the time of low-speed rotation that is less than 100 rpm, which is under the influence of cogging torque or external load, the rotation of the rotor 40 may stop. However, with the above-described adjustment process, the control device 70 can impart, to the rotor 40, a rotational force that overcomes the cogging torque before rotation of the rotor 40 stops. In addition, also when the estimated rotation speed becomes higher than the predetermined rotation speed, control is performed so that the actual rotation speed approaches the predetermined rotation speed, and therefore a speed of 100 rpm which is the predetermined rotation speed of the present example embodiment is maintained.

In addition, as shown in FIG. 6, the control portion 76 may calculate a control signal for increasing the voltage to be applied to the coil 53 on the basis of the estimated rotation speed, when the estimated rotation speed becomes equal to or lower than the actual rotation speed based on the results of the comparison by the comparison portion 75, in a case where the actual rotation speed is higher than the predetermined rotation speed. On the basis of the calculated control signal, the control portion 76 increases the voltage to be applied to the coil 53 when the estimated rotation speed becomes equal to or lower than the predetermined rotation speed. In this case, because calculation of the control signal can be completed before the estimated rotation speed becomes equal to or lower than the predetermined rotation speed, the reduced rotation speed of the rotor 40 can be recovered more quickly.

According to the present example embodiment, the control device that maintains low-speed rotation of the motor can be provided. Furthermore, with the control device of the present example embodiment, it is possible to provide the electric oil pump which realizes high responsiveness by driving the pump unit at a low rotation speed in advance.

Second Example Embodiment

In the first example embodiment, the control portion 76 increases the voltage to be applied to the coil 53 when the estimated rotation speed becomes equal to or lower than the predetermined rotation speed. In the present example embodiment, the control portion 76 increases the voltage to be applied to the coil 53 when the estimated rotation speed becomes equal to or lower than the actual rotation speed calculated on the basis of the immediately preceding positional signal. According to the present example embodiment, for example, in a case where the actual rotation speed is higher than the predetermined rotation speed, it is possible to increase the voltage to be applied to the coil 53 before the estimated rotation speed becomes equal to or lower than the predetermined rotation speed, and therefore, the rotation speed of the rotor 40 can be recovered more faster than in the first example embodiment.

Figure 7:
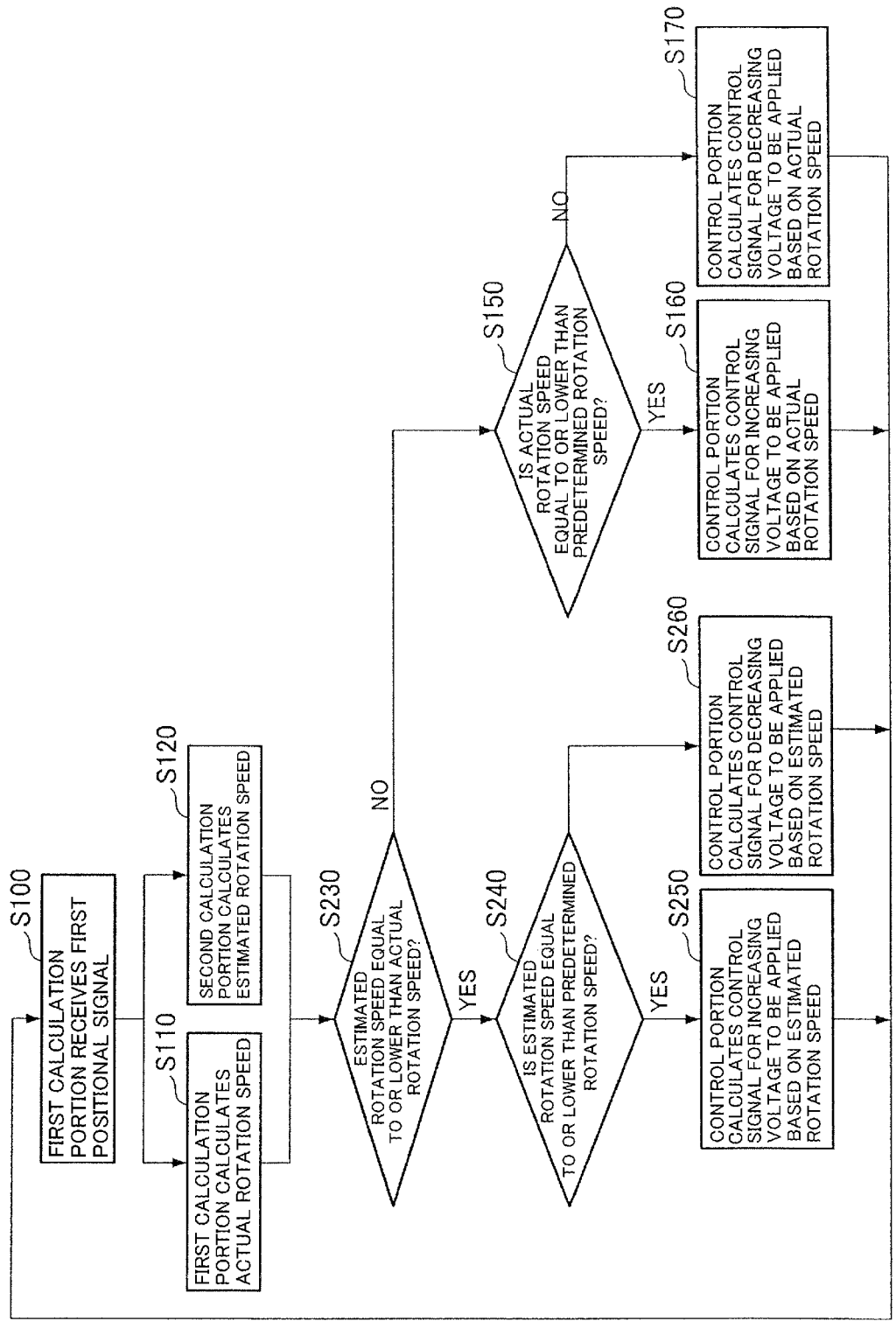
FIG. 7 is a flowchart showing a process of adjusting a drive signal of a rotor according to a second example embodiment of the present disclosure.
Figure 8:
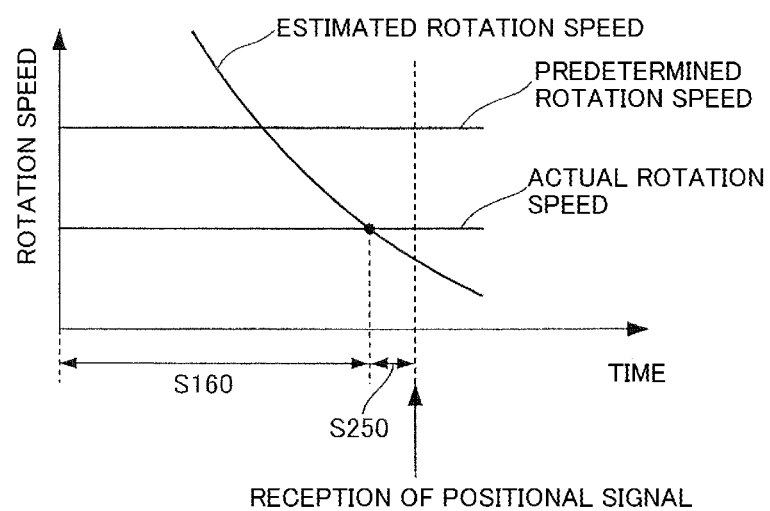
FIG. 8 is a graph showing a relationship between an actual rotation speed, an estimated rotation speed, and a predetermined rotation speed in a case where the actual rotation speed is lower than the predetermined rotation speed.
Figure 9:
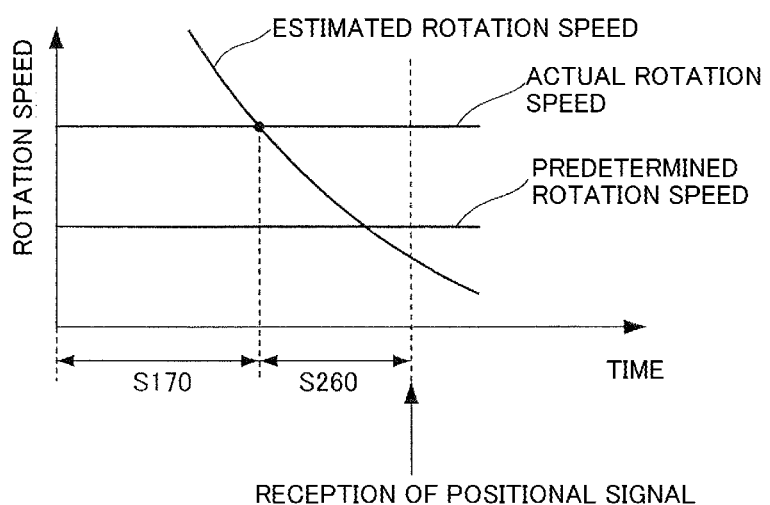
FIG. 9 is a graph showing a relationship between the actual rotation speed, the estimated rotation speed, and the predetermined rotation speed in a case where the actual rotation speed is higher than the predetermined rotation speed.

FIG. 7 is a flowchart showing the adjustment process according to the present example embodiment. FIG. 8 is a graph showing a relationship between the actual rotation speed, the estimated rotation speed, and the predetermined rotation speed in a case where the actual rotation speed is lower than the predetermined rotation speed. FIG. 9 is a graph showing a relationship between the actual rotation speed, the estimated rotation speed, and the predetermined rotation speed in a case where the actual rotation speed is higher than the predetermined rotation speed. In FIG. 8 and FIG. 9, a horizontal axis represents a time and a vertical axis represents a rotation speed. FIG. 8 and FIG. 9 show the timing of performing steps (S250, S260, S160, and S170) of adjusting the voltage by calculating the control signal shown in FIG. 7.

In the flowchart shown in FIG. 7, the same steps as those in the first example embodiment are denoted by the same reference numerals, and the description thereof will be omitted. Steps S100 to S120 are the same as those of the first example embodiment. In step S230, before the first calculation portion 73 actually receives the second positional signal, the comparison portion compares the actual rotation speed calculated by the first calculation portion 73 in step S110, the estimated rotation speed calculated by the second calculation portion 74 in step S120, and the predetermined rotation speed.

In the comparison by the comparison portion 75 in step S230, it is determined whether the estimated rotation speed is equal to or lower than the actual rotation speed. In a case where the comparison portion 75 determines that the estimated rotation speed is equal to or lower than the actual rotation speed, the comparison portion 75 determines whether the estimated rotation speed is equal to or lower than the predetermined rotation speed in step S240.

In a case where the comparison portion 75 determines that the estimated rotation speed is equal to or lower than the predetermined rotation speed in step S240, the process proceeds to step S250. In step S250, the control portion 76 calculates a control signal for increasing the voltage to be applied to the coil 53 from the estimated rotation speed, thereby increasing the voltage to be applied to the coil 53 on the basis of the calculated control signal.

In a case where the comparison portion 75 determines that the estimated rotation speed is higher than the predetermined rotation speed in step S240, the process proceeds to step S260. In step S260, the control portion 76 calculates a control signal for decreasing the voltage to be applied to the coil 53 from the estimated rotation speed, thereby decreasing the voltage to be applied to the coil 53 on the basis of the calculated control signal.

In a case where the comparison portion 75 determines that the estimated rotation speed is higher than the predetermined rotation speed in step S230, the process proceeds to S150 same as in the first example embodiment. The following steps S160 and S170 are the same as those of the first example embodiment. After step S140, S160, or S170, the process returns to step S100 (reception of the second positional signal) to repeat this flow. In step S160, for example, the control portion 76 calculates the control signal by adding the control signal on the basis of a difference between the predetermined rotation speed and the estimated rotation speed to the result calculated by the PID control method from a difference between the predetermined rotation speed and the actual rotation speed.

According to the above-described adjustment process, the control portion 76 can calculate the control signal on the basis of the estimated rotation speed to increase the voltage to be applied to the coil 53 when the estimated rotation speed becomes equal to or lower than the actual rotation speed, without waiting for the first calculation portion 73 to actually receive the second positional signal. In a case of starting control after waiting for the first calculation portion 73 to actually receive the second positional signal at the time of low-speed rotation that is less than 100 rpm, which is under the influence of cogging torque or external load, the rotation of the rotor 40 may stop. However, with the above-described adjustment process, the control device 70 can impart, to the rotor 40, a rotational force that overcomes the cogging torque before rotation of the rotor 40 stops. In addition, also when the estimated rotation speed becomes higher than the actual rotation speed, control is performed so that the actual rotation speed approaches the predetermined rotation speed. Accordingly, it is possible to maintain a speed of 100 rpm which is the predetermined rotation speed of the present example embodiment without excessively increasing the rotation speed of the rotor 40.

According to the present example embodiment, the control device that maintains low-speed rotation of the motor can also be provided as in the first example embodiment. Furthermore, it is possible to provide the electric oil pump which realizes high responsiveness by driving the pump unit at a low rotation speed in advance.

The type of the motor is not limited to the inner rotor type in the above example embodiment, and may be, for example, an outer rotor type motor in which the stator 50 is located on radially inward side of the rotor 40, or may be an axial gap type motor in which the stator 50 and the rotor 40 are disposed in a motor axial direction.

Hereinbefore, example embodiments of the present disclosure have been described, but the present disclosure is not limited to these example embodiments, and various modifications and changes can be made within the scope of the gist thereof.

The present application claims priority right based on Japanese Patent Application No. 2016-194686 filed Sep. 30, 2016, and incorporates all contents of description described in the Japanese Patent Application.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A control device to control a motor that includes a stator including a coil and a rotor including a permanent magnet, the control device comprising:
 a detector to detect a rotational position of the rotor for each predetermined rotary angle and output a positional signal indicating the detected rotational position;
 a first calculator to receive the positional signal output by the detector and calculate an actual rotation speed of the rotor based on a length of a first range of time in which the positional signal is received;
 a second calculator to calculate an estimated rotation speed of the rotor based on a length of a second range of time between a time point at which the first calculator receives the positional signal and an assumed time point at which the first calculator is expected to receive a subsequent positional signal when the first calculator receives the positional signal subsequent to a previous positional signal;
 a comparator to compare the actual rotation speed of the rotor, the estimated rotation speed, and a predetermined rotation speed of the rotor, during a period from when the first calculator receives the positional signal until the first calculator actually receives the subsequent positional signal; and
 a controller to calculate a control signal to adjust a voltage to be applied to the coil from the actual rotation speed or the estimated rotation speed and control the voltage to be applied to the coil based on the calculated control signal; wherein
 based on results of the comparison by the comparator, the controller increases the voltage to be applied to the coil based on a control signal to increase the voltage to be applied to the coil, which is calculated from the estimated rotation speed, when the estimated rotation speed becomes equal to or lower than the predetermined rotation speed, increases the voltage to be applied to the coil based on a control signal to increase the voltage to be applied to the coil, which is calculated from the actual rotation speed, in a case where the actual rotation speed is equal to or lower than the predetermined rotation speed when the estimated rotation speed becomes higher than the predetermined rotation speed, and decreases the voltage to be applied to the coil based on a control signal to decrease the voltage to be applied to the coil, which is calculated from the actual rotation speed, in a case where the actual rotation speed is higher than the predetermined rotation speed when the estimated rotation speed becomes higher than the predetermined rotation speed.

2. The control device according to claim 1, wherein the controller calculates a control signal to increase the voltage to be applied to the coil based on the estimated rotation speed, when the estimated rotation speed becomes equal to or lower than the actual rotation speed based on the results of the comparison by the comparator, in a case where the actual rotation speed is higher than the predetermined rotation speed.

3. The control device according to claim 1, wherein the controller calculates the control signal by a PID control method based on the actual rotation speed or the estimated rotation speed and the predetermined rotation speed.

4. The control device according to claim 1, wherein the controller changes the voltage to be applied to the coil based on the control signal by adjusting a duty ratio of a drive signal of the rotor by a pulse width modulation method.

5. The control device according to claim 1, wherein the controller calculates the control signal based on one estimated rotation speed until the first calculator receives the subsequent positional signal.

6. The control device according to claim 1, wherein the detector includes a magnetic sensor.

7. The control device according to claim 6, wherein the magnetic sensor includes a Hall element.

8. The control device according to claim 7, wherein the positional signal output from the detector including the Hall element is a set of positional signals including a plurality of signals.

9. The control device according to claim 6, wherein the magnetic sensor includes a magnetic resistance element.

10. The control device according to claim 6, wherein a number of times n that the positional signal is output from the detector during one rotation of the rotor is a value obtained by multiplying a number of magnetic sensors by a number of magnetic poles detected by the magnetic sensor.

11. The control device according to claim 10, wherein the number of magnetic poles detected by the magnetic sensor is larger than the number of magnetic poles of the permanent magnet.

12. The control device according to claim 10, wherein the number of times n is equal to or greater than a lowest common multiple of the number of magnetic poles of the permanent magnet and a number of teeth of the stator.

13. The control device according to claim 1, wherein the detector includes an optical encoder.

14. The control device according to claim 1, wherein the detector includes a resolver.

15. The control device according to claim 12, wherein a number of times the positional signal is output from the detector during one rotation of the rotor is equal to or more than a lowest common multiple of a number of magnetic poles of the permanent magnet and a number of teeth of the stator.

16. A motor that is controlled by the control device according to claim 1.

17. An electric oil pump comprising a pump that is driven by the motor according to claim 16.

18. The electric oil pump according to claim 17, wherein the pump is a positive displacement pump that sucks and discharges oil by changing an internal volume.

19. The electric oil pump according to claim 18, wherein the pump is a diaphragm pump that changes an internal volume by a reciprocating motion of a diaphragm or is a gear pump that changes the internal volume by a rotational motion of a gear.

20. A control device to control a motor that includes a stator including a coil and a rotor including a permanent magnet, the control device comprising:
a detector to detect a rotational position of the rotor for each predetermined rotary angle and output a positional signal indicating the detected rotational position;
a first calculator to receive the positional signal output by the detector and calculate an actual rotation speed of the rotor based on a length of a first range time in which the positional signal is received;
a second calculator to calculate an estimated rotation speed of the rotor based on a length of a second range of time between a time point at which the first calculator receives the positional signal and an assumed time point at which the first calculator is expected to receive a subsequent positional signal when the first calculator receives the positional signal subsequent to a previous positional signal;
a comparator to compare the actual rotation speed of the rotor, the estimated rotation speed, and a predetermined rotation speed of the rotor, during a period from when the first calculator receives the positional signal until the first calculator actually receives the subsequent positional signal; and
a controller to calculate a control signal to adjust a voltage to be applied to the coil from the actual rotation speed or the estimated rotation speed and controls the voltage to be applied to the coil based on the calculated control signal; wherein
the controller calculates a control signal to increase the voltage to be applied to the coil based on the estimated rotation speed to increase the voltage to be applied to the coil based on the calculated control signal, in a case where the estimated rotation speed is equal to or lower than the predetermined rotation speed when the estimated rotation speed becomes equal to or lower than the actual rotation speed based on results of the comparison by the comparison portion, and calculates a control signal to decrease the voltage to be applied to the coil based on the estimated rotation speed to decrease the voltage to be applied to the coil based on the calculated control signal, in a case where the estimated rotation speed is higher than the predetermined rotation speed when the estimated rotation speed becomes equal to or lower than the actual rotation speed based on results of the comparison by the comparison portion; and
the controller increases the voltage to be applied to the coil based on a control signal to increase the voltage to be applied to the coil, which is calculated from the actual rotation speed, in a case where the actual rotation speed is equal to or lower than the predetermined rotation speed when the estimated rotation speed becomes higher than the actual rotation speed, and decreases the voltage to be applied to the coil based on a control signal to decrease the voltage to be applied to the coil, which is calculated from the actual rotation speed, in a case where the actual rotation speed is higher than the predetermined rotation speed when the estimated rotation speed becomes higher than the actual rotation speed.

21. A method for controlling a motor using a control device to control the motor that includes a stator including a coil and a rotor including a permanent magnet, the method comprising:

receiving a positional signal that indicates a rotational position of the rotor, which is detected for each predetermined rotary angle of the rotor;

calculating an actual rotation speed of the rotor based on a length of a first range of time between a time point at which the positional signal is received and a time point at which a previous positional signal prior to the positional signal is received;

calculating an estimated rotation speed of the rotor based on a length of a second range of time between a time point at which the positional signal is received and an assumed time point at which a subsequent positional signal is expected to be received when the positional signal is received subsequent to a previous positional signal;

comparing the actual rotation speed, the estimated rotation speed, and a predetermined rotation speed of the rotor, during a period from when the positional signal is received until the subsequent positional signal is received; and based on results of the comparing, increasing a voltage to be applied to the coil based on a control signal to increase the voltage to be applied to the coil, which is calculated from the estimated rotation speed, when the estimated rotation speed becomes equal to or lower than the predetermined rotation speed, increasing the voltage to be applied to the coil based on a control signal to increase the voltage to be applied to the coil, which is calculated from the actual rotation speed, in a case where the actual rotation speed is equal to or lower than the predetermined rotation speed when the estimated rotation speed becomes higher than the predetermined rotation speed, and decreasing the voltage to be applied to the coil based on a control signal to decrease the voltage to be applied to the coil, which is calculated from the actual rotation speed, in a case where the actual rotation speed is higher than the predetermined rotation speed when the estimated rotation speed becomes higher than the predetermined rotation speed.

22. A method for controlling a motor using a control device to control the motor that includes a stator including a coil and a rotor including a permanent magnet, the method comprising:

receiving a positional signal that indicates a rotational position of the rotor, which is detected for each predetermined rotary angle of the rotor;

calculating an actual rotation speed of the rotor based on a length of a first range of time between a time point at which the positional signal is received and a time point at which a previous positional signal prior to the positional signal is received;

calculating an estimated rotation speed of the rotor based on a length of a second time interval a time point at which the positional signal is received and an assumed time point at which a subsequent positional signal is expected to be received when the positional signal is received subsequent to a previous positional signal;

comparing the actual rotation speed, the estimated rotation speed, and a predetermined rotation speed of the rotor, during a period from when the positional signal is received until the subsequent positional signal is received;

calculating a control signal to increase the voltage to be applied to the coil based on the estimated rotation speed to increase the voltage to be applied to the coil based on the calculated control signal, in a case where the estimated rotation speed is equal to or lower than the predetermined rotation speed when the estimated rotation speed becomes equal to or lower than the actual rotation speed based on results of the comparison, and calculating a control signal to decrease the voltage to be applied to the coil based on the estimated rotation speed to decrease the voltage to be applied to the coil based on the calculated control signal, in a case where the estimated rotation speed is higher than the predetermined rotation speed when the estimated rotation speed becomes equal to or lower than the actual rotation speed based on results of the comparison by the comparison portion; and increasing the voltage to be applied to the coil based on a control signal to increase the voltage to be applied to the coil, which is calculated from the actual rotation speed, in a case where the actual rotation speed is equal to or lower than the predetermined rotation speed when the estimated rotation speed becomes higher than the actual rotation speed, and decreasing the voltage to be applied to the coil based on a control signal to decrease the voltage to be applied to the coil, which is calculated from the actual rotation speed, in a case where the actual rotation speed is higher than the predetermined rotation speed when the estimated rotation speed becomes higher than the actual rotation speed.

23. A motor that is controlled by the control method according to claim 21.

24. An electric oil pump comprising a pump that is driven by the motor according to claim 23.

25. The electric oil pump according to claim 24, wherein the pump is a positive displacement pump that sucks and discharges oil by changing an internal volume.

26. The electric oil pump according to claim 25, wherein the pump is a diaphragm pump that changes the internal volume by a reciprocating motion of a diaphragm or is a gear pump that changes the internal volume by a rotational motion of a gear.

* * * * *